Aug. 8, 1933.   O. R. BURDEN   1,921,986
TESTING APPARATUS
Filed March 20, 1930

Inventor
Oscar R. Burden
By his Attorney
R. J. Dearborn

Patented Aug. 8, 1933

1,921,986

UNITED STATES PATENT OFFICE 1,921,986

TESTING APPARATUS

Oscar R. Burden, Wichita Falls, Tex., assignor to The Texas Company, New York, N. Y., a Corporation of Delaware Application March 20, 1930. Serial No. 437,340

2 Claims. (Cl. 265—45)

This invention relates to apparatus for testing liquids, more particularly to a testing kit to be used in the determination of the specific gravity of a liquid such as oil, and has for its primary object the provision of an improved, compact kit which can be readily carried by an operator from place to place and in which the delicate instruments to be used will be protected from breakage.

Another object of my invention is the provision of a wind deflecting member for shielding the instruments while readings are being taken.

In carrying out my invention in one form, I have provided an oil testing kit in which the instruments, such as a pair of hydrometers are safely housed during transportation and which may be easily carried by an operator and set up, for instance, on the roof of an oil tank, without danger of falling over. I have further provided a wind deflecting member which serves as a cap or cover for one end of the kit during transportation, and as a shielding means for the open end of the oil container when readings are being taken.

Figure 1:
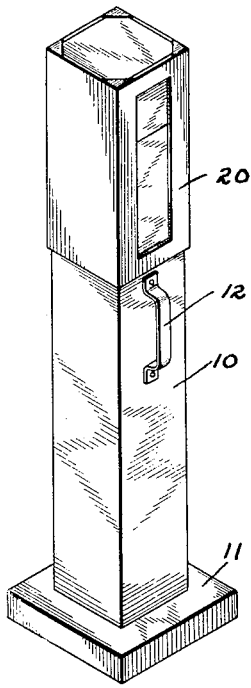
Figure 2:
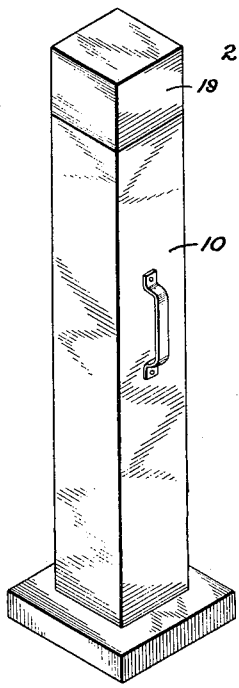
Figure 5:
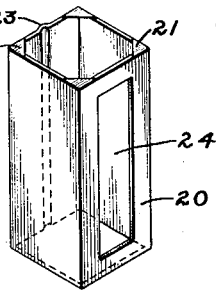
Figure 6:
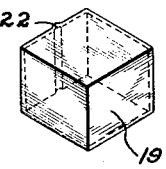
Figure 3:
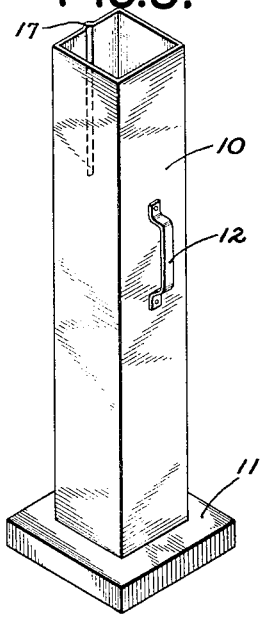
Figure 4:
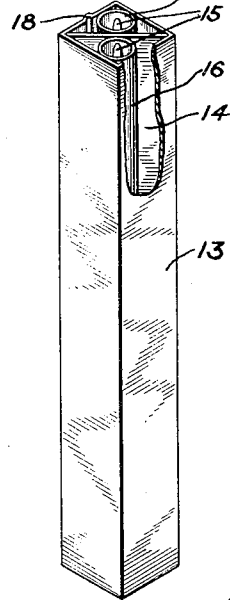
Figure 7:
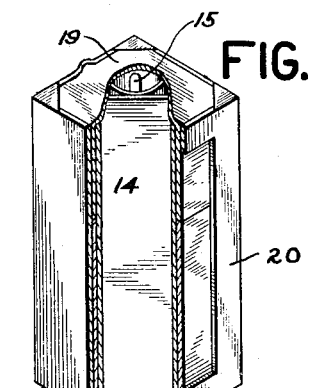

For a better understanding of my invention, reference may be had to the accompanying drawing, in which Fig. 1 is a perspective view of my testing kit assembled for carrying; Fig. 2 is a perspective view similar to Fig. 1 but with the wind deflector removed; Fig. 3 is a perspective view of the oil container; Figs. 4, 5 and 6 are perspective views respectively of the instrument case, wind deflector and cap for the instrument case; while Fig. 7 is a perspective view with parts broken away showing the method of assembling the kit.

Referring to the drawing, an elongated receptacle 10 serves as the container or jar in which the oil or other liquid to be tested is held during a test, and also as a carrying case for the instruments to be used. The receptacle or jar 10 is preferably square in section and may be made of any suitable material, although aluminum is preferred, due to its strength and lightness. Secured to the lower end of the jar 10 is a base 11, which may be of the same material as the jar, but which is larger in cross-section and preferably non-circular in shape. Suitably secured to one side of the jar is a handle 12 to be used in carrying the kit from place to place.

An instrument case 13 slightly longer than the jar 10 and of the same general shape but slightly smaller in section, is arranged to have a sliding fit and to be telescoped within the jar. The instrument case 13 is provided with a partition 14 dividing the instrument case into two elongated compartments in which are carried the testing instruments, such as a pair of hydrometers 15. The hydrometers may be further encased in tubular members 16 of soft fiber or felt, which fit snugly in the compartments of the instrument case and serve to protect the hydrometers from breakage during transportation. A pair of interlocking grooves 17 and 18 are formed respectively in the jar 10 and the instrument case 13 and aid in holding the instrument case securely in position. A cap member 19 slightly larger in section than the instrument case 13 serves to fit over and close the upper end of the instrument case when the instruments 15 are not in use. Preferably, the compartments of the instrument case 13 are lined with a soft material such as felt (not shown) to further protect the hydrometers 15. It will thus be observed that when the hydrometers 15 are inserted in the tubes 16 and the cap member 19 placed on the instrument case 13 a receptacle is thus provided which will effectively protect and prevent breakage of the hydrometers when they are not in use.

In order to prevent the wind from disturbing the hydrometer and moving or tilting it in the oil so that inaccuracies of the readings will result, I have provided a wind deflector comprising a short tubular member 20 of the same section but slightly larger than the jar 10. The wind deflector 20 is open at the lower end and substantially open at the upper end except for the provision of corner stops 21, which serve to limit the movement of the wind deflector when it is telescoped over the upper end of the jar, as shown in Figs. 1 and 7. The cap member 19 and the wind deflector 20 are also provided with interlocking grooves 22 and 23 respectively to cooperate to hold these members in position. One side of the wind deflector 20 is provided with an elongated sight opening or window 24.

When it is desired to carry the kit from one place to another, the hydrometers 15 are inserted in the tubes 16, the cap member 19 is then placed over the case 13 and the instrument case 13 then telescoped within the jar 10 as is shown in Fig. 2. The wind deflector 20 is then telescoped over the upper end of the jar, as is shown in Figs. 1 and 7, and the kit may then be carried by means of the handle 12. When the operator or oil gauger is ready to make a test he removes the wind deflector 20 and withdraws the instrument case from the jar 10. The sample of oil to be tested is then placed in the jar and the hydrometer 15 is removed from the instrument case 13 and floated in the oil. If sufficient wind is blowing to cause a deflection of the stem of the hydrometer and thus an inaccurate reading, the gauger slips the wind deflector 20 over the upper end of the jar. The stem of the hydrometer 15 is then protected from the wind and will stand erect. The operator can then obtain his reading by looking through the window 24 in the side wall of the wind deflector 20.

From the foregoing description it will be observed that I have provided a liquid testing or gauging kit which is compact and has a minimum number of parts. When readings are being taken the enlarged base 11 serves to hold the jar upright and in case the jar should be overturned, the non-circular shape of the jar and the base will prevent rolling, even though the jar should be resting on an inclined surface, such as the roof of an oil tank.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

1. In combination with a jar for containing a liquid to be tested, a wind deflector having sliding, telescoping engagement with one end of said jar, said deflector being provided in one side thereof with a sight opening through which observations may be made.

2. In combination with an elongated jar for containing a liquid to be tested, said jar being of non-circular cross-section and provided with an enlarged base member to aid said jar in standing in an upright position, a wind deflector having the same shape in cross-section as said jar and having sliding engagement with one end of said jar, said deflector being provided in one side thereof with a sight opening through which the interiors of said jar and deflector may be observed.

OSCAR R. BURDEN.